US012573133B2

(12) United States Patent
Landgraf et al.

(10) Patent No.: US 12,573,133 B2
(45) Date of Patent: Mar. 10, 2026

(54) REPROJECTION METHOD OF GENERATING REPROJECTED IMAGE DATA, XR PROJECTION SYSTEM, AND MACHINE-LEARNING CIRCUIT

(71) Applicant: Holo-Light GmbH, Innsbruck (AT)

(72) Inventors: Philipp Landgraf, Altenmarkt a.d. Alz (DE); Alexander Werlberger, Haimhausen (DE); Michael Sedrak, Munich (DE)

(73) Assignee: Holo-Light GmbH, Innsbruck (AT)

( * ) Notice: Subject to any disclaimer, the term of this patent is extended or adjusted under 35 U.S.C. 154(b) by 208 days.

(21) Appl. No.: 18/191,978

(22) Filed: Mar. 29, 2023

(65) Prior Publication Data

US 2023/0316636 A1 Oct. 5, 2023

(30) Foreign Application Priority Data

Mar. 30, 2022 (EP) ..................................... 22165571

(51) Int. Cl.
*G06T 15/20* (2011.01)
*G06N 3/091* (2023.01)

(52) U.S. Cl.
CPC ........... *G06T 15/205* (2013.01); *G06N 3/091* (2023.01)

(58) Field of Classification Search
CPC ....... G06T 15/205; G06T 11/00; G06N 3/091; G06N 3/0464; G06N 3/09; G06F 3/011; G06F 3/012
See application file for complete search history.

(56) References Cited

U.S. PATENT DOCUMENTS 11,288,543 B1      3/2022   Tovchigrechko
2016/0216518 A1 *  7/2016   Raghoebardajal ..... G09G 3/003
                   (Continued)

FOREIGN PATENT DOCUMENTS

WO        2020238741 A1   12/2020
WO      WO 2023023162 A1 *  2/2023   ............... G06T 7/33

OTHER PUBLICATIONS

EP Application No. 22165571, European Search Report mailed Sep. 15, 2022, 9 pages.
(Continued)

*Primary Examiner* — Devona E Faulk
*Assistant Examiner* — Donna J. Ricks
(74) *Attorney, Agent, or Firm* — Gilliam IP PLLC

(57) ABSTRACT

A reprojection method for generating reprojected image data to be displayed on an XR device is described. The reprojection method comprising
determining momentary position data,
generating preliminary image data based on the momentary position data,
determining updated position data.
The momentary position data, the preliminary image data, and updated position data are then input into a machine-learning circuit, wherein the machine-learning circuit comprises a machine-learning model that is pre-trained to reproject the preliminary image data based on the momentary position data, the preliminary image data, and the updated position data.
Thus, the preliminary image data is reprojected by means of the machine-learning circuit, thereby generating reprojected image data that corresponds to at least one reprojected XR image to be displayed on the XR device.

20 Claims, 3 Drawing Sheets

(56) References Cited

U.S. PATENT DOCUMENTS

| | | | |
|---|---|---|---|
| 2020/0410740 A1* | 12/2020 | Croxford | ................ G06T 7/251 |
| 2021/0358155 A1 | 11/2021 | Price et al. | |
| 2022/0375028 A1* | 11/2022 | Jung | ....................... G06F 3/147 |
| 2023/0216999 A1* | 7/2023 | Zobel | ........................ G06T 5/60 |
| | | | 348/42 |

OTHER PUBLICATIONS

"World, View and Projection Transformation Matrices", [online], [retrieved on Feb. 22, 2022] Retrieved from the Internet: <http://www.codinglabs.net/article_world_view_projection_matrix.aspx>.

* cited by examiner

S1 — determine momentary position data

S2 — generate preliminary image data

S3 — determine updated position data

S4 — reproject preliminary image data by means of a machine-learning model

Fig. 4

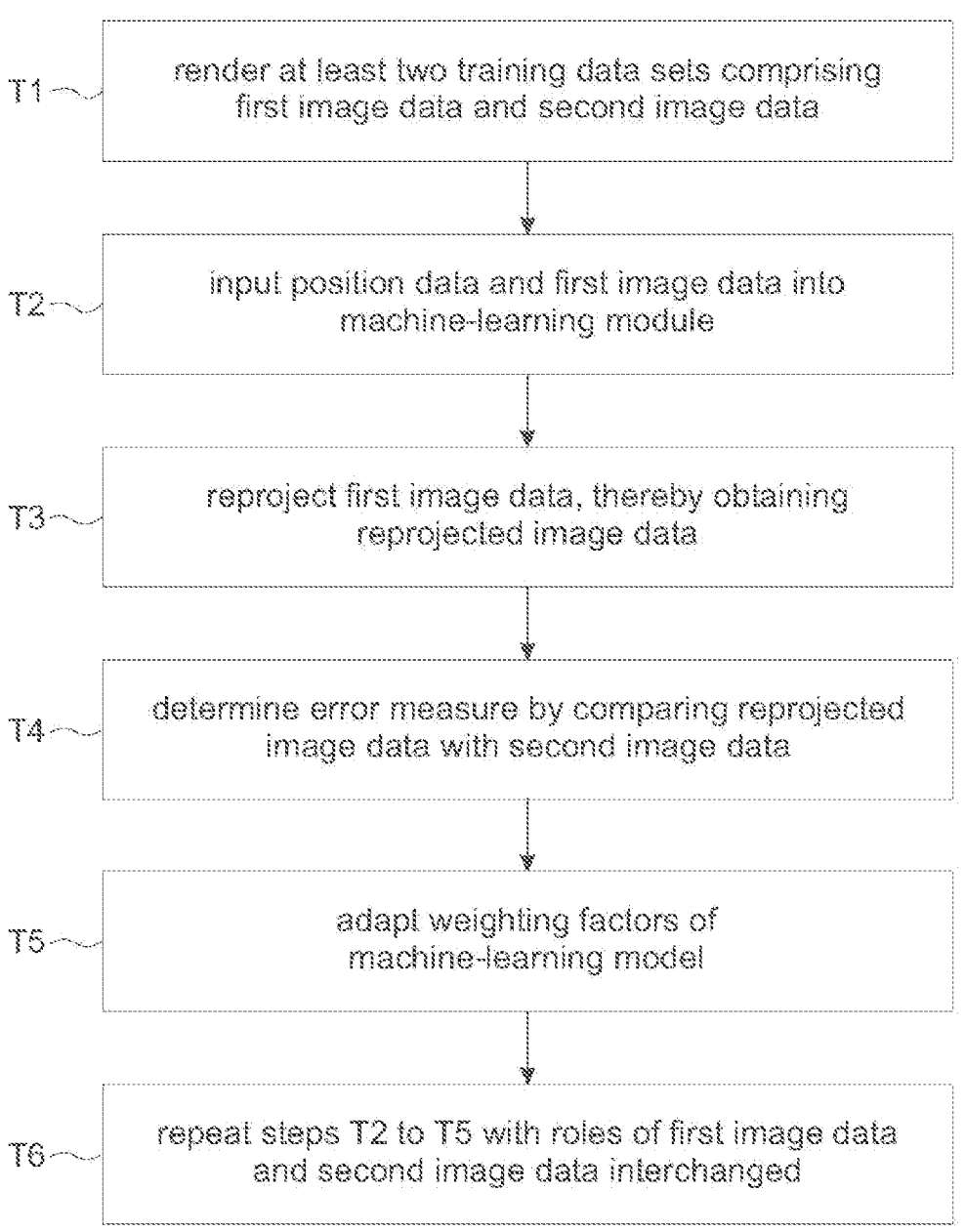

T1 — render at least two training data sets comprising first image data and second image data T2 — input position data and first image data into machine-learning module T3 — reproject first image data, thereby obtaining reprojected image data T4 — determine error measure by comparing reprojected image data with second image data T5 — adapt weighting factors of machine-learning model T6 — repeat steps T2 to T5 with roles of first image data and second image data interchanged

REPROJECTION METHOD OF GENERATING REPROJECTED IMAGE DATA, XR PROJECTION SYSTEM, AND MACHINE-LEARNING CIRCUIT

FIELD OF THE DISCLOSURE

Embodiments of the present disclosure generally relate to a reprojection method of generating reprojected image data to be displayed on an XR device. Embodiments of the present disclosure further relate to an XR projection system as well as to a machine-learning circuit.

BACKGROUND

In extended reality (XR) applications, which are also called "XR applications", reprojection is important in order to ensure a pleasant user experience while using an XR-capable device.

In general, reprojection is used in order to correctly compensate any latency between determining the position of the XR device until the image is rendered on a display of the XR device.

After rendering, the position of the XR device is determined again, and a reprojection algorithm shifts the image according to the difference of these positions, resulting in stable XR images, particularly holograms.

According to known reprojection techniques, each pixel of the rendered image is shifted by means of a corresponding algorithm, namely based on the difference of the position used to render and the position the XR device has now.

However, it has turned out that the results of the reprojection may be suboptimal, especially when the latency to be compensated is rather large, e.g. in the magnitude of 100 milliseconds (ms), or when rather large differences between the positions of the XR device have to be addressed.

Thus, there is a need for a reprojection method and an XR projection system with an enhanced quality of the reprojection.

SUMMARY

Embodiments of the present disclosure provide a reprojection method of generating reprojected image data to be displayed on an XR device. The reprojection method comprises the steps of:

determining momentary position data, wherein the momentary position data is associated with a momentary position of the XR device;

generating preliminary image data based on the momentary position data, wherein the preliminary image data corresponds to at least one XR image to be displayed on the XR device;

determining updated position data, wherein the updated position data is associated with a position of the XR device at the time at which the at least one XR image is to be displayed;

inputting the momentary position data, the preliminary image data, and the updated position data into a machine-learning circuit, wherein the machine-learning circuit comprises a machine-learning model that is pre-trained to reproject the preliminary image data based on the momentary position data, the preliminary image data, and the updated position data; and reprojecting the preliminary image data by means of the machine-learning circuit, thereby generating reprojected image data, wherein the reprojected image data corresponds to at least one reprojected XR image to be displayed on the XR device.

Therein and in the following, the term "position" is understood to denote a location and/or orientation.

Accordingly, the term "momentary position of the XR device" relates to the momentary location and/or to the momentary orientation of the XR device, etc.

The term "XR device" is understood to denote an electronic device that is configured to display an extended reality (XR) image, i.e. an augmented reality (AR) image, a mixed reality (MR) image, and/or a virtual reality (VR) image.

For example, the XR device may be a head-mounted display, e.g. an electronic wearable having the shape of glasses. However, it is to be understood that the XR device may be established as any other XR-capable electronic device, e.g. as a smartphone or as a tablet.

Moreover, the term "XR image" is understood to denote at least one virtual image.

In the case of augmented reality or mixed reality, the XR image corresponds to at least one virtual image that is superimposed over reality.

For example, the XR device may be a head-mounted display with a semi-transparent display, wherein the virtual image is displayed on the semi-transparent display, such that the user can directly see the environment through the semi-transparent display, but with the virtual image superimposed.

As another example, the XR device may be a head-mounted display that is optically opaque. In this case, the head-mounted display may comprise at least one internal camera, particularly several internal cameras being configured to capture images of the environment of the head-mounted display. The real images captured by means of the internal camera are superimposed with the virtual image(s), and the resulting superposition of the real image(s) and the augmented reality image(s) is displayed on a display of the head-mounted display.

As another example, the XR device may be a smartphone or a tablet, wherein an image captured by means of a camera of the XR device is superimposed with the at least one virtual image, and the resulting image is displayed on a display.

In the case of virtual reality, the XR image corresponds to a virtual image being displayed on a display of the XR device.

For example, the XR device may be a head-mounted display that is optically opaque. The VR images may be displayed on a display of the head-mounted display.

Further, the term "circuit" is understood to describe suitable hardware, suitable software, or a combination of hardware and software that is configured to have a certain functionality.

The hardware may, inter alia, comprise a CPU, a GPU, an FPGA, an ASIC, or other types of electronic circuitry.

Particularly, the machine-learning model is established as a computer program comprising program code means that are executable on the hardware of the machine-learning circuit, particularly on a processing unit of the machine-learning circuit.

The reprojection method according to the present disclosure is based on the idea to use an appropriately trained machine-learning model in order to perform the reprojection instead of shifting each pixel by means of a conventional reprojection algorithm.

It has turned out that the machine-learning based approach has several major advantages over the conventional reprojection algorithm approach.

The reprojection method according to the present disclosure provides stable, world-anchored holograms even for large differences between the momentary position and the position of the XR device at the time at which the at least XR image is to be displayed. For example, such large position differences may arise when the user's head moves quickly.

Further, the reprojection method according to the present disclosure provides stable, world-anchored holograms even for large latencies, e.g. for latencies over 100 ms, which are a further possible cause for large differences between the momentary position and the position of the XR device at the time at which the at least one XR image is to be displayed.

In other words, the reprojection method according to the present disclosure provides stable, world-anchored holograms in spite of fast movements of the XR device.

Moreover, it has turned out that the machine-learning based reprojection method according to the present disclosure is capable of displaying portions of the at least one XR image that have been invisible at the momentary position of the XR device, but that would be visible at the position of the XR device at the time at which the at least one XR image is to be displayed.

In other words, the at least XR image to be displayed can be augmented with missing portions of the image by means of the reprojection method according to the present disclosure, which is not possible with conventional pixel-shifting reprojection algorithms.

According to an aspect of the present disclosure, the machine-learning model is based on an artificial neural network. Accordingly, the machine-learning model comprises an input layer, an output layer, and one or several intermediary layers that are interconnected between the input layer and the output layer. The momentary position data, the preliminary image data, and the updated position data are fed into the input layer of the artificial neural network. The reprojected image data corresponds to the output data of the artificial neural network, which is output by the output layer of the artificial neural network.

In general, any suitable architecture may be used for the artificial neural network. For example, the individual layers of the artificial neural network may be fully connected or may be partially connected.

Particularly, the artificial neural network may be based on a convolutional neural network. This type of artificial neural network is particularly suitable for processing image data.

The artificial neural network may be pre-trained by any suitable machine-learning technique, particularly by means of any suitable deep learning technique.

According to another aspect of the present disclosure, the XR device comprises the machine-learning circuit. Alternatively, the machine-learning circuit is integrated into an external computer device that is connected with the XR device in a signal-transmitting manner.

If the XR device comprises the machine-learning circuit, the reprojection can be performed by the XR device, such that the corresponding data does not have to be transferred between the XR device and an external computer device. This way, the latency can be reduced.

Moreover, the XR device may be established as a stand-alone device being independent of any external computer device. In this case, the XR device may further be configured to generate the preliminary image data, determine the momentary position data, and/or determine the updated position data.

On the other hand, if the machine-learning circuit is integrated into the external computer device, the power consumption of the XR device is reduced. This is particularly advantageous if the XR device is powered by a battery, as the maximum time of operation without recharge is extended.

According to an embodiment of the present disclosure, the XR device comprises at least one position sensor, wherein the momentary position data and/or the updated position data is determined by means of the at least one position sensor. For example, the at least one sensor may be established as a gyroscope, as an acceleration sensor, as a magnetometer, as a global navigation satellite system (GNSS) device, or as any other suitable type of position sensor.

Alternatively or additionally, the momentary position data and/or the updated position data may be determined by means of at least one external camera, particularly by means of an external stereo camera or several external cameras. The at least one external camera may be connected to an analysis circuit that is configured to determine the momentary position data and/or the updated position data based on images of the XR device captured by means of the at least one external camera.

The analysis circuit may be integrated into the XR device or into an external computer device.

Optionally, the XR device may comprise one or several light-emitting elements, particularly one or several LEDs. The analysis circuit may determine the momentary position data and/or the updated position data based on images of the one or several light-emitting elements captured by means of the at least one external camera, particularly via triangulation.

Further, it is also conceivable that the XR device comprises at least one internal camera, wherein the at least one internal camera is configured to capture images of an environment of the XR device. The analysis circuit may determine the momentary position data and/or the updated position data based on the images captured by the at least one internal camera.

In a further embodiment of the present disclosure, the updated position data corresponds to a predicted position of an XR device at the time at which at least one XR image is to be displayed. In other words, the updated position data may not be measured directly, but rather predicted based on previous measurements.

For example, a velocity and/or an acceleration of the XR device may be determined together with the momentary position data, particularly by means of suitable sensors. Based on the momentary position data as well as based on the velocity and/or acceleration, the updated position data may be extrapolated from the momentary position data.

A further aspect of the present disclosure provides that the preliminary image data comprises depth information, particularly depth information for each pixel of the at least one XR image, and wherein the machine-learning model is pre-trained to reproject the preliminary image data based on the depth information. In other words, the preliminary image data comprises information on a distance of a virtual image or virtual object to be displayed from the XR device.

In general, the reprojection depends on the distance of the virtual image or virtual object to be displayed from the XR device, as virtual images and objects that are further away have to be shifted by a smaller amount than virtual images and objects being closer to the XR device. As the preliminary image data comprises the depth information, the machine-learning model can correctly account for the respective distance information on each pixel when performing the reprojection.

Particularly, the XR device comprises at least one camera, wherein the momentary position data and the updated position data are associated with a position of the at least one camera.

The at least one camera may be configured to capture images of the environment of the XR device that are to be superimposed or rather overlaid with a virtual image, as already described above.

According to an aspect of the present disclosure, the preliminary image data and/or the reprojected image data comprise information on a view matrix and/or a projection matrix. In general, the XR image to be displayed may comprise virtual, world-anchored objects, particularly virtual 3D objects. Accordingly, these objects may be defined in a fixed coordinate space having its origin in the environment of the XR device. This coordinate space may also be called "world space".

The view matrix comprises all information necessary in order to transform objects from the world space to the view space, wherein the view space is associated with the XR device, particularly with the at least one camera of the XR device. In the view space, the at least one camera may rest at the origin, particularly wherein the main view direction of the XR device and/or the at least one camera is along the z-axis.

In other words, the view matrix comprises all information necessary in order to transform the virtual objects, particularly the virtual 3D objects, such that these objects can be correctly displayed in view of the position of the XR device.

Thus, as the location and orientation of the XR device changes, the view matrix changes as well. Accordingly, the view matrix may be time-variant.

Particularly, the view matrix may be determined based on a determined momentary position of the XR device or of the at least one camera of the XR device.

Likewise, the view matrix may be determined based on a determined updated position of the XR device or of the at least one camera of the XR device.

The projection matrix comprises all information necessary in order to project objects from the view space into the projection space, wherein the projection space is associated with the XR device, particularly with the at least one camera of the XR device. In general, this projection of objects into the projection space allows to correctly display virtual (3D) objects on the XR device.

In an embodiment of the present disclosure, the view matrix and/or the projection matrix relate to the at least one camera. Thus, it is ensured that the at least one XR image is displayed correctly. Particularly, in the case of AR or MR, it is ensured that the at least one XR image is correctly overlaid with the real environment.

Embodiments of the present disclosure further provide an XR projection system. The XR projection system comprises an XR device and a machine-learning circuit. The XR projection system is configured to perform the reprojection method described above.

Regarding the advantages and further properties of the XR projection system, reference is made to the explanations given above with respect to the reprojection method, which also hold for the XR projection system and vice versa.

According to an aspect of the present disclosure, the XR device comprises the machine-learning circuit. Alternatively, the machine-learning circuit is integrated into an external computer device that is connected with the XR device in a signal-transmitting manner.

If the XR device comprises the machine-learning circuit, the reprojection can be performed by the XR device, such that the corresponding data does not have to be transferred between the XR device and an external computer device. This way, the latency can be reduced.

Moreover, the XR device may be established as a stand-alone device being independent of any external computer device. In this case, the XR device may further be configured to generate the preliminary image data, determine the momentary position data, and/or determine the updated position data.

On the other hand, if the machine-learning circuit is integrated into the external computer device, the power consumption of the XR device is reduced. This is particularly advantageous if the XR device is powered by a battery, as the maximum time of operation without recharge is extended.

In an embodiment of the present disclosure, the XR projection system comprises a rendering circuit, wherein the rendering circuit is configured to generate the preliminary image data based on the momentary position data, particularly wherein the XR device comprises the rendering circuit, or the rendering circuit is integrated into an external computer device that is connected with the XR device in a signal-transmitting manner.

If the XR device comprises the rendering circuit, the preliminary image data can be generated by the XR device, such that the corresponding data does not have to be transferred between the XR device and an external computer device. This way, the latency associated with generating the preliminary image data can be reduced.

On the other hand, if the rendering circuit is integrated into the external computer device, the power consumption of the XR device is reduced. This is particularly advantageous if the XR device is powered by a battery, as the maximum time of operation without recharge is extended.

Embodiments of the present disclosure further provide a machine learning circuit for use in a reprojection method, particularly in a reprojection method described above, and/or in an XR projection system, particularly in an XR projection system described above. The machine-learning circuit comprises a machine-learning model that is pre-trained to reproject preliminary image data based on momentary position data, preliminary image data, and updated position data, thereby generating reprojected image data to be displayed on an XR device. The momentary position data is associated with a momentary position of the XR device. The updated position data is associated with a position of the XR device at the time at which the image data is to be displayed.

Regarding the advantages and further properties of the machine-learning circuit, reference is made to the explanations given above with respect to the reprojection method and the XR projection system, which also hold for the machine-learning circuit and vice versa.

According to an aspect of the present disclosure, the machine-learning model is trained with at least two training data sets, wherein a first one of the at least two training data sets comprises first image data associated with a first position of the XR device, and wherein a second one of the at least two training data sets comprises image data associated with a second position of the XR device. In general, the first image data corresponds to the correct XR image to be displayed at the first position of the XR device, while the second image data corresponds to the correct XR image to be displayed at the second position of the XR device.

For example, the first image data and/or the second image data may be rendered by means of a rendering circuit of the XR projection system described above.

Thus, the machine-learning model is trained with the correct XR images. For example, one of the first image data and the second image data may serve as input data, and the other of the first image data and the second image data may serve as reference data. In other words, the machine-learning model may reproject one of the first image data and the second image data, and the result of the reprojection may be compared with the other of the first image data and the second image data in order to train the machine-learning model.

According to a further aspect of the present disclosure, the machine-learning model is trained by means of the steps of:

inputting position data corresponding to the first position, the first image data, and position data corresponding to the second position into the machine-learning circuit;

reprojecting the first image data by means of the machine-learning circuit, thereby generating reprojected image data;

comparing the reprojected image data with the second image data;

determining an error measure based on the comparison of the reprojected image data with the second image data; and adapting weighting factors of the machine-learning model such that the error measure is reduced;

particularly wherein the following additional training steps are performed:

inputting position data corresponding to the second position, the second image data, and position data corresponding to the first position into the machine-learning circuit;

reprojecting the second image data by means of the machine-learning circuit, thereby generating reprojected image data;

comparing the reprojected image data with the first image data;

determining an error measure based on the comparison of the reprojected image data with the first image data; and adapting weighting factors of the machine-learning model such that the error measure is reduced.

In general, the error measure is a mathematical quantity that is indicative of a deviation of the reprojected image data from the corresponding correct reference image data.

For example, the error measure may be or comprise a cost functional, wherein the value of the cost functional increases the more the reprojected image data deviates from the corresponding correct reference image data.

The training method described above is particularly resource-efficient, as each set of image data may serve as both input data and as reference data. Thus, the amount of image data sets necessary in order to train the machine-learning model can be reduced.

Any suitable machine-learning technique may be used in order to adapt the weighting factors of the machine-learning model.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 4 shows a flow chart of a method of training a machine-learning circuit according to the present disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

For the purposes of the present disclosure, the phrase "at least one of A, B, and C", for example, means (A), (B), (C), (A and B), (A and C), (B and C), or (A, B, and C), including all further possible permutations when more than three elements are listed. In other words, the term "at least one of A and B" generally means "A and/or B", namely "A" alone, "B" alone or "A and B".

Figure 1:
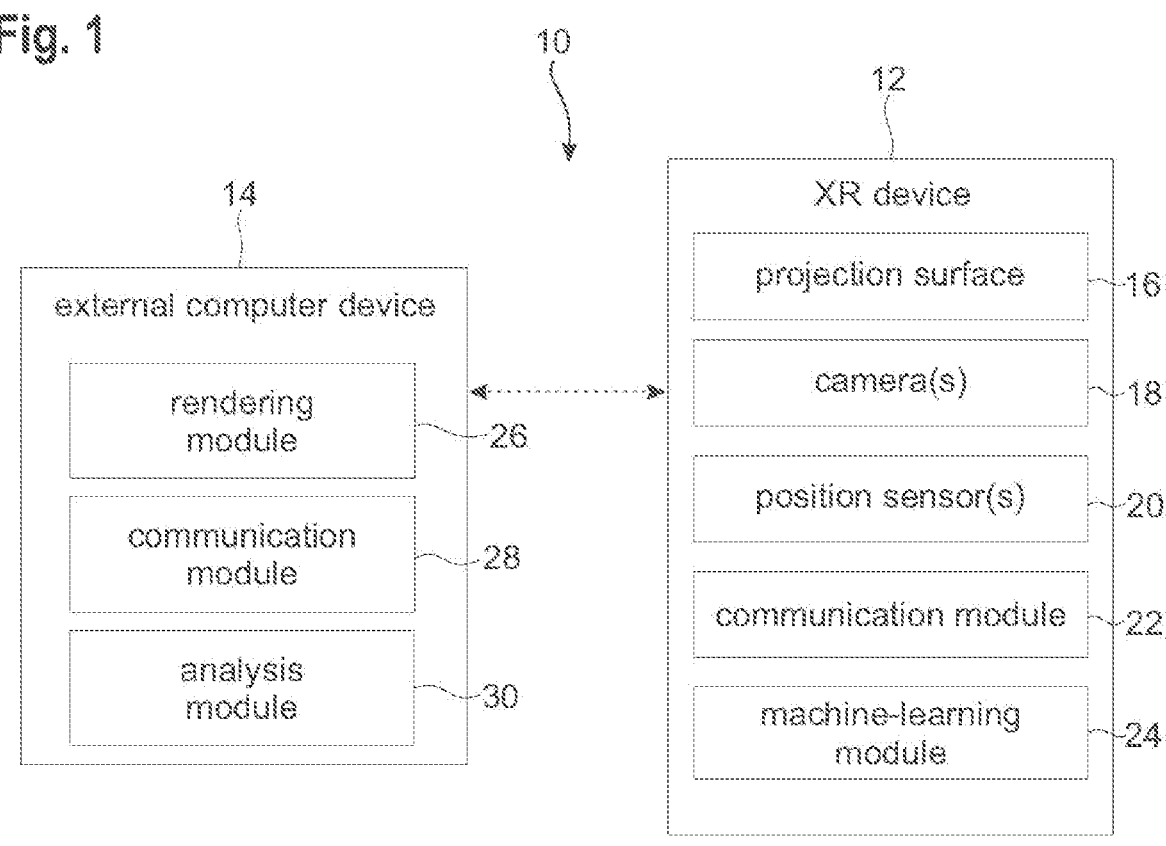
FIG. 1 schematically shows a block diagram of an XR projection system according to the present disclosure.

FIG. 1 schematically shows a block diagram of an XR projection system 10 comprising an XR device 12 and an external computer device 14 being connected with the XR device 12 in a signal-transmitting manner.

Therein and in the following, the term "connected in a signal transmitting manner" is understood to denote a cable-based or wireless connection that is configured to transmit signals between the respective devices or components.

In general, the XR device 12 is an electronic device that is configured to display an extended reality (XR) image, i.e. an augmented reality (AR) image, a mixed reality (MR) image, and/or a virtual reality (VR) image.

Figure 2:
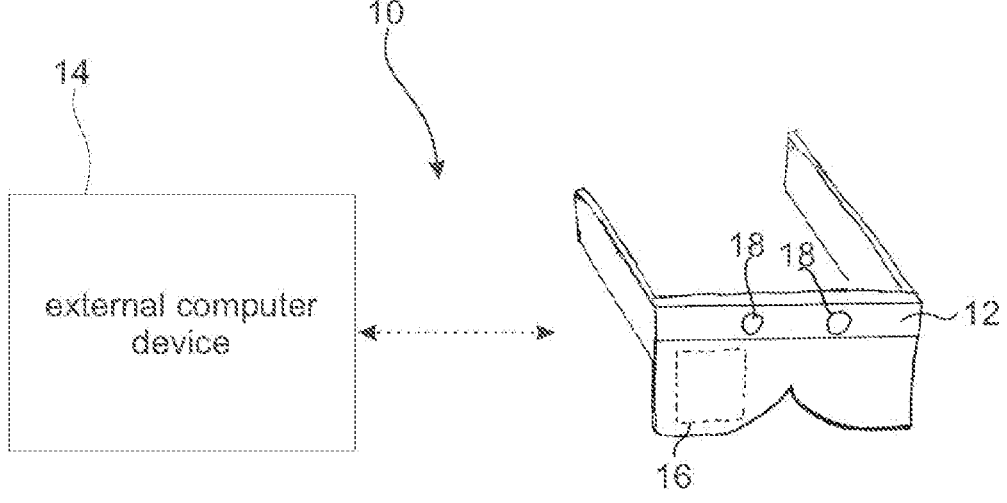
FIG. 2 schematically shows an exemplary embodiment of the XR projection system of FIG. 1.

As is illustrated in FIG. 2, the XR device 12 may, for example, be configured as a head-mounted display, particularly as an electronic wearable having the shape of glasses.

However, it is to be understood that the XR device 12 may be established as any other XR-capable electronic device, e.g. as a smartphone or as a tablet.

In general, the XR projection system 10 allows a user to observe and/or interact with virtual objects, particularly virtual 3D objects.

If the XR projection system 10 is an AR projection system or an MR projection system, these virtual objects are embedded into a real environment of the user.

Accordingly, the XR device 12 comprises at least one projection surface 16, wherein at least an XR image to be displayed is projected onto the projection surface 16, such that the virtual object is displayed to the user.

The projection surface 16 may be a display of the XR device 12.

Optionally, the XR projection system 10 may comprise at least one handheld input device (not shown in FIG. 1), wherein the user may control the XR projection system 10 by means of the at least one handheld input device.

For example, the at least one handheld input device may be established as a pen-shaped device or as any other type of suitable input device.

The XR device 12 further comprises at least one camera 18, at least one position sensor 20, a communication circuit 22, and a machine-learning circuit 24.

Therein and in the following, the term "circuit" is understood to describe suitable hardware, suitable software, or a combination of hardware and software that is configured to have a certain functionality.

The hardware may, inter alia, comprise a CPU, a GPU, an FPGA, an ASIC, or other types of electronic circuitry.

The at least one camera 18 is configured to capture images of an environment of the XR device 12, particularly of an environment in front of the XR device 12.

Particularly, the at least one camera 18 may be established as a stereo camera. Alternatively or additionally, the XR device 12 may comprise several cameras with overlapping field of view. Thus, depth-information on images taken by the at least one camera 18 can be determined based on images taken by the at least one camera 18.

The at least one position sensor 20 is configured to determine a position, i.e. a location and/or orientation of the XR device 12.

For example, the at least one position sensor 20 may be established as a gyroscope, as an acceleration sensor, as a magnetometer, as a GNSS device, and/or as any other suitable type of position sensor.

In general, the external computer device 14 may be established as any type of electronic computing device that is configured to have the functionality described below.

For example, the external computer device 14 may be established as a server with suitable hardware and with suitable software being executed on the hardware.

As another example, the external computer device 14 may be established as a personal computer, as a laptop, as a notebook, as a MAC, as a tablet, as a smartphone, or as any other type of smart device.

The external computer device 14 comprises a rendering circuit 26, and a communication circuit 28.

Optionally, the external computer device 14 comprises an analysis circuit 30.

The functionality of the individual circuits will be described in more detail below.

The communication circuit 22 of the XR device 12 and the communication circuit 28 of the external computer device 14 are configured to communicate with each other.

In fact, image data, position data and/or control data may be exchanged between the XR device 12 and the external computer device 14 by means of the communication circuits 22, 28.

Therein, any suitable wireless or cable-based transmission technique may be used by the communication circuits 22, 28, e.g. WLAN, 4G, 5G, Ethernet, etc.

It is noted that the embodiment of the XR projection system 10 illustrated in FIGS. 1 and 2 is understood to be exemplary.

In fact, the machine-learning circuit 24, the rendering circuit 26 and/or the analysis circuit 30 may all be integrated into the XR device 12. Thus, the XR device 12 may be established as a standalone device being independent of any external computer device, or may be operable in conjunction with the external computer device 14.

Further, it is also conceivable that the machine-learning circuit 24 is integrated into the external computer device 14.

Figure 3:
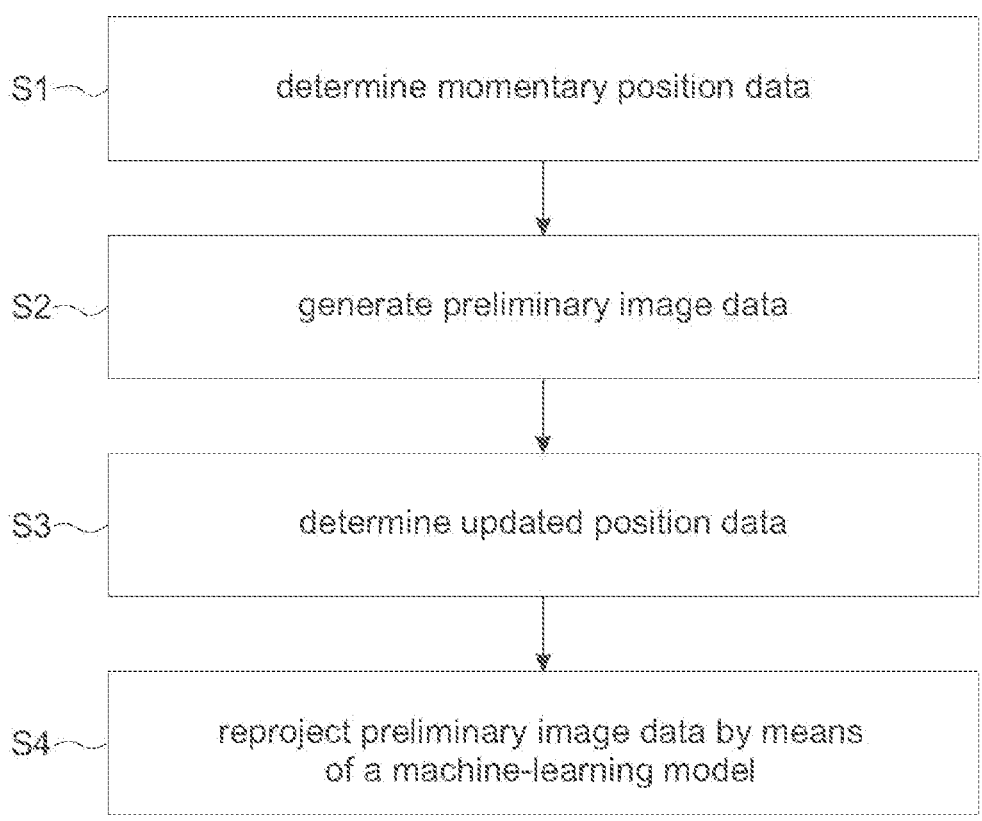
FIG. 3 shows a flow chart of a reprojection method according to the present disclosure.

The XR projection system 10 is configured to perform a reprojection method for generating reprojected image data to be displayed on the XR device 12, which is explained in the following with reference to FIG. 3.

Momentary position data is determined, wherein the momentary position data is associated with a momentary position of the XR device 12 (step S1).

In general, the momentary position data comprises information on a momentary location of the XR device 12 and/or information on a momentary orientation of the XR device 12.

Preferably, the momentary position data comprises information on the momentary location of the XR device 12 and information on the momentary orientation of the XR device 12, as this uniquely determines the field of view of a user of the XR device 12 or of the XR device 12 itself.

In the exemplary embodiment shown in FIGS. 1 and 2, the momentary position data is determined by means of the at least one position sensor 20 of the XR device 12.

Alternatively or additionally, the momentary position data may be determined by means of at least one external camera, i.e. at least one camera that is not integrated into the XR device 12.

The at least one external camera may be connected to the analysis circuit 30, wherein the analysis circuit 30 is configured to determine the momentary position data based on images of the XR device 12 captured by means of the at least one external camera. The analysis circuit 30 may be integrated into the XR device 12 or into the external computer device 14.

Optionally, the XR device 12 may comprise one or several light-emitting elements, particularly one or several LEDs. The analysis circuit 30 may determine the momentary position data based on images of the one or several light-emitting elements captured by means of the at least one external camera, particularly via triangulation.

Further, it is also conceivable that the analysis circuit 30 may determine the momentary position data based on images captured by means of the at least one camera 18.

The momentary position data is transmitted to the rendering circuit 26 via the communication circuits 22, 28.

Preliminary image data is generated based on the momentary position data by means of the rendering circuit 26 (step S2).

The preliminary image data corresponds to at least one XR image to be displayed on the XR device 12.

In other words, the preliminary image data corresponds to a virtual object, particularly a virtual 3D object, that is to be displayed on the XR device 12.

For the case of augmented reality or mixed reality, the preliminary image data corresponds to a virtual object, particularly a virtual 3D object, which is to be embedded in the real environment of the user.

The preliminary image data may comprise depth information, particularly depth information for each pixel of the at least one XR image.

In other words, the preliminary image data comprises information on a distance of a virtual image or virtual object to be displayed from the XR device 12.

Updated position data is determined, wherein the updated position data is associated with a position of the XR device 12 at the time at which the at least one XR image is to be displayed on the XR device 12 (step S3).

The updated position data may be determined by means of the at least one position sensor 20 or by any of the other techniques described above.

Alternatively, the updated position data corresponds to a predicted position of the XR device 12 at the time at which at least one XR image is to be displayed.

For example, a velocity and/or an acceleration of the XR device 12 may be determined together with the momentary position data, particularly by means of the at least one position sensor 20.

Based on the momentary position data as well as based on the velocity and/or acceleration, the updated position data may be extrapolated from the momentary position data, e.g. by means of the analysis circuit 30.

The momentary position data, the preliminary image data, and the updated position data are input into the machine-learning circuit 24.

The preliminary image data is reprojected by means of the machine-learning circuit 24, thereby generating reprojected image data (step S4).

The reprojected image data corresponds to a reprojected XR image to be displayed on the XR device 12.

In other words, the reprojected image data corresponds to the at least one XR image to be displayed on the XR device 12, which is shifted appropriately such that the XR image is correctly displayed at the position corresponding to the updated position data.

It is noted that the preliminary image data and/or the reprojected image data may comprise information on a view matrix and/or a projection matrix.

As the XR image to be displayed may comprise virtual, world-anchored objects, particularly virtual 3D objects, the view matrix and/or the projection matrix comprise useful information for correctly displaying the XR image on the XR device 12.

The view matrix comprises all information necessary in order to transform objects from the world space to the view space, wherein the view space is associated with the XR device 12, particularly with the at least one camera 18 of the XR device 12. In the view space, the at least one camera 18 may rest at the origin, particularly wherein the main view direction of the at least one camera is along the z-axis.

Particularly, the view matrix may be determined based on a determined momentary position of the XR device 12 or of the at least one camera 18 of the XR device 12.

Likewise, the view matrix may be determined based on a determined updated position of the XR device 12 or of the at least one camera 18 of the XR device 12.

The projection matrix comprises all information necessary in order to project objects from the view space into the projection space, wherein the projection space is associated with the XR device 12, particularly with the at least one camera 18 of the XR device 12. In general, this projection of objects into the projection space allows to correctly display virtual (3D) objects on the XR device 12.

The machine-learning circuit 24 comprises a machine-learning model that is pre-trained to reproject the preliminary image data based on the momentary position data, the preliminary image data, and the updated position data.

Particularly, the machine-learning model may be pre-trained to reproject the preliminary image data based on the depth information comprised in the preliminary image data.

Without restriction of generality, it is assumed in the following that the machine-learning model is an artificial neural network that is pre-trained to reproject the preliminary image data based on the momentary position data, the preliminary image data, and the updated position data.

However, it is to be understood that any other suitable machine-learning model may be used as well.

The artificial neural network comprises an input layer, an output layer, and one or several intermediary layers that are interconnected between the input layer and the output layer.

Thus, the momentary position data, the preliminary image data, and the updated position data are fed into the input layer of the artificial neural network, and are processed by the input layer, the intermediary layers, and the output layer.

The reprojected image data corresponds to the output data of the artificial neural network, which is output by the output layer of the artificial neural network.

The artificial neural network may be pre-trained by any suitable machine-learning technique, particularly by means of any suitable deep learning technique.

For example, the artificial neural network may be pre-trained by means of a training method described in the following with reference to FIG. 4.

The training method may be performed by means of the XR projection system 10, or by a dedicated training system.

At least two training data sets of image data are rendered by means of the rendering circuit 26 (step T1).

The at least two training data sets comprise first image data associated with a first position of the XR device 12, and second image data associated with a second position of the XR device 12.

Position data corresponding to the first position, the first image data, and position data corresponding to the second position are input into the machine-learning circuit 24 or rather into the machine-learning model (step T2).

For this portion of the training, the position data corresponding to the first position, the first image data, and the position data corresponding to the second position serve as input training data, while the second image data serves as reference training data.

The first image data is reprojected by means of the machine-learning model, thereby obtaining reprojected image data (step T3).

An error measure is determined by comparing the reprojected image data with the second image data (step T4).

In general, the error measure is a mathematical quantity that is indicative of a deviation of the reprojected image data from the corresponding correct reference image data, namely the second image data.

For example, the error measure may be or may comprise a cost functional, wherein the value of the cost functional increases the more the reprojected image data deviates from the second image data.

Weighting factors of the machine-learning model are adapted such that the error measure is reduced (step T5).

By adapting the weighting factors, the machine-learning model is trained to correctly reproject the preliminary image data.

Steps T2 to T5 described above may be repeated, but with the roles of the first image data and the second image data interchanged (step T6).

Accordingly, the position data corresponding to the second position, the second image data, and position data corresponding to the first position are input into the machine-learning circuit 24 or rather into the machine-learning model.

The second image data is reprojected by means of the machine-learning model, thereby obtaining reprojected image data.

An error measure is determined by comparing the reprojected image data with the first image data, and weighting factors of the machine-learning model are adapted such that the error measure is reduced.

Of course, the training steps described above may be repeated for further image data sets.

Certain embodiments disclosed herein, particularly the respective module(s) and/or unit(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

The invention claimed is:

1. A reprojection method of generating reprojected image data to be displayed on an extended reality (XR) device, wherein the reprojection method comprises:

pre-training a machine learning model with at least two training data sets comprising first image data associated with a first position of the XR device and second image data associated with a second position of the XR device, wherein the pre-training comprises, inputting position data corresponding to the first position, the first image data, and position data corresponding to the second position into a machine-learning circuit; and invoking the machine-learning circuit to reproject the first image data, thereby generating reprojected image data;

comparing the reprojected image data with the second image data;

determining an error measure based on comparing the reprojected image data with the second image data; and adapting weighting factors of the machine-learning model to reduce the error measure;

determining momentary position data, wherein the momentary position data is associated with a momentary position of the XR device;

generating preliminary image data based on the momentary position data, wherein the preliminary image data corresponds to at least one XR image to be displayed on the XR device;

determining updated position data, wherein the updated position data is associated with a position of the XR device at a time at which the at least one XR image is to be displayed;

inputting the momentary position data, the preliminary image data, and the updated position data into the machine-learning circuit which comprises the pre-trained machine-learning model to reproject the preliminary image data based on the momentary position data, the preliminary image data, and the updated position data; and reprojecting the preliminary image data to generate reprojected image data, wherein reprojecting the preliminary image data comprises inputting the momentary position data, the preliminary image data, and the updated position data into the machine-learning circuit and wherein the reprojected image data corresponds to at least one reprojected XR image to be displayed on the XR device.

2. The reprojection method of claim 1, wherein the machine-learning model is based on an artificial neural network.

3. The reprojection method of claim 1, wherein the XR device comprises the machine-learning circuit.

4. The reprojection method according to claim 1, wherein the machine-learning circuit is integrated into an external computer device connected with the XR device in a signal-transmitting manner.

5. The reprojection method of claim 1, wherein the XR device comprises at least one position sensor, wherein the momentary position data and/or the updated position data are determined with the at least one position sensor.

6. The reprojection method of claim 1, wherein the updated position data corresponds to a predicted position of the XR device at the time at which at least one XR image is to be displayed.

7. The reprojection method of claim 1, wherein the preliminary image data comprise depth information, and wherein the machine-learning model is pre-trained to reproject the preliminary image data based on the depth information.

8. The reprojection method of claim 7, wherein the preliminary image data comprise depth information for each pixel of the at least one XR image.

9. The reprojection method of claim 1, wherein the XR device comprises at least one camera, wherein the momentary position data and the updated position data are associated with a position of the at least one camera.

10. The reprojection method of claim 1, wherein the preliminary image data and/or the reprojected image data comprise information on a view matrix and/or a projection matrix.

11. The reprojection method of claim 10, wherein the view matrix and/or the projection matrix relate to at least one camera of the XR device.

12. The reprojection method of claim 1, wherein the momentary position data comprises momentary location data of the XR device and the updated position data comprises updated location data of the XR device.

13. The reprojection method of claim 1, wherein the momentary position data comprises momentary orientation data of the XR device and the updated position data comprises updated orientation data of the XR device.

14. An extended reality (XR) projection system, the XR projection system comprising an XR device and a machine-learning circuit, wherein the XR projection system is configured to:

determine momentary position data, wherein the momentary position data is associated with a momentary position of the XR device;

generate preliminary image data based on the momentary position data, wherein the preliminary image data corresponds to at least one XR image to be displayed on the XR device;

determine updated position data, wherein the updated position data is associated with a position of the XR device at a time at which the at least one XR image is to be displayed;

input the momentary position data, the preliminary image data, and the updated position data into a machine-learning circuit, wherein the machine-learning circuit comprises a machine-learning model that is pre-trained to reproject the preliminary image data based on the momentary position data, the preliminary image data, and the updated position data; and reproject the preliminary image data with the machine-learning circuit to generate reprojected image data, wherein the reprojected image data corresponds to at least one reprojected XR image to be displayed on the XR device; and wherein the machine-learning model has been trained on at least two datasets comprising first image data corresponding to a first position of the XR device and second image data corresponding to a second position of the XR device and wherein weighting factors of the machine-learning model were adjusted to reduce an error measure determined based on comparison of the second image data with reprojected image data that was generated from invocation of the machine-learning circuit on position data corresponding to the first position, the first image data, and position data corresponding to the second position.

15. The XR projection system of claim 14, wherein the XR device comprises the machine-learning circuit.

16. The XR projection system of claim 14, wherein the machine-learning circuit is integrated into an external computer device connected with the XR device in a signal-transmitting manner.

17. The XR projection system of claim 14, wherein the XR projection system comprises a rendering circuit, wherein the rendering circuit is configured to generate the preliminary image data based on the momentary position data.

18. The XR projection system of claim 17, wherein the XR device comprises the rendering circuit, or the rendering circuit is integrated into an external computer device connected with the XR device in a signal-transmitting manner.

19. A machine learning circuit comprising:

a machine-learning model that is pre-trained to reproject preliminary image data based on momentary position data, preliminary image data, and updated position data, which generates reprojected image data to be displayed on an extended reality (XR) device, wherein the momentary position data is associated with a momentary position of the XR device, wherein the updated position data is associated with a position of the XR device at a time at which the reprojected image data is to be displayed, wherein the machine-learning model was pre-trained on at least two datasets comprising first image data corresponding to a first position of the XR device and second image data corresponding to a second position of the XR device and wherein weighting factors of the machine-learning model were adjusted to reduce an error measure determined based on comparison of the second image data with reprojected image data that was generated from invocation of the machine-learning circuit on position data corresponding to the first position, the first image data, and position data corresponding to the second position.

20. The machine-learning circuit of claim 19, wherein the weighting factors of the machine-learning model were also adjusted to reduce an error measure determined based on comparison of the first image data with reprojected image data that was generated from invocation of the machine-learning circuit on position data corresponding to the second position, the second image data, and position data corresponding to the first position.

* * * * *